US006865489B2

(12) United States Patent
Jing

(10) Patent No.: US 6,865,489 B2
(45) Date of Patent: Mar. 8, 2005

(54) METHOD FOR COMPENSATING MILD LATERAL VELOCITY VARIATIONS IN PRE-STACK TIME MIGRATION IN THE FREQUENCY-WAVE NUMBER DOMAIN

(75) Inventor: Charlie Jing, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/632,068

(22) Filed: Jul. 31, 2003

(65) Prior Publication Data

US 2004/0117123 A1 Jun. 17, 2004

Related U.S. Application Data

(60) Provisional application No. 60/415,382, filed on Oct. 2, 2002.

(51) Int. Cl.[7] ............................ G01N 15/08; G01V 1/00
(52) U.S. Cl. ............................ 702/16; 702/14; 367/73
(58) Field of Search ............................ 702/14, 16, 17; 367/50, 53, 73

(56) References Cited

U.S. PATENT DOCUMENTS

| 6,446,007 B1 | 9/2002 | Finn et al. ............... 702/14 |
| 6,643,590 B2 * | 11/2003 | Wiggins ............... 702/16 |

OTHER PUBLICATIONS

Bevc, et al. (1995) "Plumes: Response of Time Migration to Lateral Velocity Variation", Geophysicis 60, pp. 1118–1127.
Black and Brzostowski (1994) "Systematics of Time Migration Errors", Geophysics 59, pp. 1419–1434.

Finn and Winbow, (2002), "3–D Prestack migration of Common–Offset Data in the Frequency–Wavenumber Domain", 72$^{nd}$ SEG Int'l Mtg and Expo, Extended Abstracts.

Hanitzsch (1997) "Comparison of Weights in Prestack Amplitude Preserving Kirchohoff Depth Migration", Geophysics 62, pp. 1812–1816.

Kim, et al. (1989) "Recursive Wavenumber–Frequency Migration", Geophysics 54, pp. 319–329.

Schleicher et al., (1993) "3–D True Amplitude Finite–Offset Migration", Geophysics 58, pp. 1112–1126.

Yilmaz, O. (1994) "Seismic Data Processing", Society of Exploration Geophysics, p. 269.

* cited by examiner

Primary Examiner—John Barlow
Assistant Examiner—Meagan S Walling
(74) Attorney, Agent, or Firm—J. Paul Plummer

(57) ABSTRACT

A method for performing pre-stack time migration of seismic data in a region where the subsurface seismic wave propagation velocity varies in both the vertical direction and a horizontal direction. The migration is performed in the wave number—frequency domain and involves using travel time maps to find a linear fitting of the migration phase shift for a given ray parameter and at a given vertical depth versus horizontal position. The slope and intercept parameters from the linear fit are used to adjust a known pre-stack time migration equation, with the accuracy of the linear approximation requiring mild horizontal velocity variation.

4 Claims, 9 Drawing Sheets

(6 of 9 Drawing Sheet(s) Filed in Color)

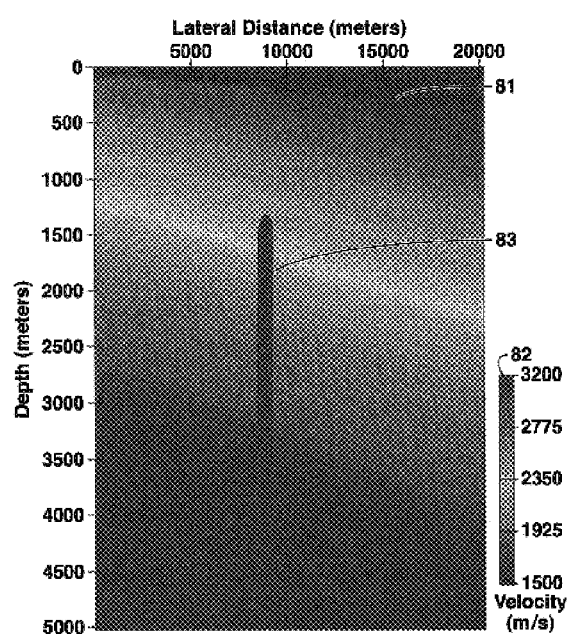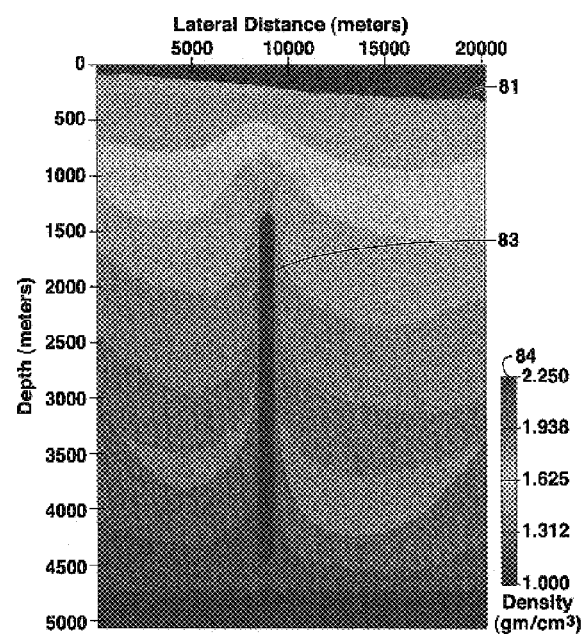
*FIG. 8A*  *FIG. 8B*

METHOD FOR COMPENSATING MILD LATERAL VELOCITY VARIATIONS IN PRE-STACK TIME MIGRATION IN THE FREQUENCY-WAVE NUMBER DOMAIN

This application claims the benefit of U.S. Provisional Application No. 60/415,382 filed on Oct. 2, 2002.

FIELD OF THE INVENTION

This invention relates generally to the field of seismic prospecting and, more particularly, to imaging of seismic data. Specifically, the invention is a method for prestack time migration of seismic data where the velocity function has mild lateral variation.

BACKGROUND

In the oil and gas industry, seismic prospecting techniques are commonly used to aid in the search for and evaluation of subterranean hydrocarbon deposits. A seismic prospecting operation consists of three separate stages: data acquisition, data processing, and data interpretation. The success of a seismic prospecting operation is dependent on satisfactory completion of all three stages. Petroleum engineers know how to produce hydrocarbons from reserves found by a successful prospecting operation.

In the data acquisition stage, a seismic source is commonly used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

Typically, some form of seismic migration (also known as "imaging") must be performed during the data processing stage in order to accurately position the subsurface seismic reflectors. The need for seismic migration arises because variable seismic velocities and dipping reflectors cause seismic reflections in unmigrated seismic images to appear at incorrect locations. Seismic migration is an inversion operation in which the seismic reflections are moved or "migrated" to their true subsurface positions.

There are many different seismic migration techniques. Some of these migration techniques are applied after common-midpoint (CMP) stacking of the data traces. (As is well known, CMP stacking is a data processing procedure in which a plurality of seismic data traces having the same source-receiver midpoint but different offsets are summed to form a stacked data trace that simulates a zero-offset data trace for the midpoint in question.) Such "poststack" migration can be done, for example, by integration along diffraction curves (known as "Kirchhoff" migration), by numerical finite difference or phase-shift downward-continuation of the wavefield, or by equivalent operations in frequency-wavenumber or other domains.

Conversely, other seismic migration techniques are applied before stacking of the seismic data traces. In other words, these "prestack" migration techniques are applied to the individual nonzero-offset data traces and the migrated results are then stacked to form the final image. Prestack migration typically produces better images than poststack migration. However, prestack migration is generally much more expensive than poststack migration. Accordingly, the use of prestack migration has typically been limited to situations where poststack migration does not provide an acceptable result, e.g., where the reflectors are steeply dipping.

In some cases, reflector dip can exceed 90 degrees. As is well known in the seismic prospecting art, it may be possible to image these "overturned" reflectors using data from seismic "turning rays." Prestack migration techniques must be used in order to obtain an accurate image of overturned reflectors from seismic turning ray data.

There are two general types of prestack migration, prestack time migration and prestack depth migration. A background seismic wave propagation velocity model to describe the seismic wave propagation velocity in the subsurface is needed in the seismic imaging. In a region where the subsurface seismic wave velocity varies only in the vertical direction, the seismic imaging method used is prestack time migration (PSTM). In a region where the subsurface seismic wave propagation velocity varies in both vertical and lateral (or horizontal) direction, pre-stack depth migration (PSDM), needs to be used to give accurate results.

Both vertical time and lateral position errors occur in time migration whenever there are lateral velocity variations in the subsurface. See, for example, "Plumes: Response of Time Migration to Lateral Velocity Variation", by Bevc, et al., *Geophysics* 60, pp. 1118–1127 (1995); or "Systematics of Time Migration Errors", by Black and Brzostowski, *Geophysics* 59, pp. 1419–1434 (1994). Mild lateral velocity variations may be approximately compensated by interpolating multiple velocity functions or multiple travel time tables from different locations when the PSTM is performed in space domain, as in the Kirchhoff summation algorithm. See, for example, *Seismic Data Processing*, by O. Yilmaz, Society of Exploration Geophysics, pages 269–271 (1987). A common offset seismic section is defined as the seismic section of the same source-receiver spacing (offset). PSTM of a common offset section in the frequency-wavenumber $(k,\omega)$ domain is much more efficient than in real space. See, for example, "Recursive Wavenumber-Frequency Migration", by Kim, et al., *Geophysics* 54, pp. 319–329 (1989); or the Finn and Winbow reference cited below.

However, there is no known way to treat mild lateral velocity variations in the Fourier domain similar to the methods used in the space domain. Very often, the water bottom may have a small dip in a marine survey, or the subsurface velocity may have an increasing or decreasing trend along a specific lateral direction. These lateral velocity variations are usually big enough to cause errors, particularly in the lateral position of steeply dipping reflectors, when the traditional PSTM is applied using a single laterally-invariant velocity function. Full PSDM will properly position seismic images. However it is far more expensive than PSTM.

A current method used to compensate the errors caused by the mild lateral velocity variations is to do residual move-out correction (lining up images of different offsets by shifting the image vertically) before the final stack (adding images of different offsets together). The purpose of this residual move-out correction is to enhance the final stack image. It can not correct the lateral position error. It can not focus diffraction energy correctly. Therefore, it will loose the sharpness of fault images and give incorrect reflector dips (Bevc, 1995). The correction to the lateral velocity variations should be incorporated into the migration operator in order to correct both the vertical time error and the lateral positioning error.

What is needed is a practical method for accounting for mild lateral velocity variations in the frequency-wavenumber domain. The present invention provides such a method.

SUMMARY OF THE INVENTION

In one embodiment, the present invention is a method for pre-stack migration of common offset seismic traces obtained from a subterranean region where the seismic velocity varies both laterally (with x) and vertically (with $z$), said method comprising steps of (a) selecting seismic velocity functions $v(z)$ at at least two lateral ($x_s$) locations (for a two-dimensional case and three lateral locations for a three-dimensional case) in said subterranean region, the number of such locations being determined by the degree of lateral velocity variation; (b) transforming said common offset seismic data traces from the space-time (x-t) domain to the wave number-frequency (k-ω) domain; (c) calculating a travel time map for each $x_s$ location using the velocity function selected for such location; (d) calculating for each travel time map from step (c) a corresponding map of τ as a function of wave number p, where ωτ is the phase shift in the k-ω domain corresponding to the migration time shift in the x-t domain; (e) using the τ-maps to find τ(p) as a linear function of x with a certain slope and intercept at each depth ($z$) location in the subterranean region and each value of p; (f) forming the migrated image from said seismic traces in the k-w domain using the τ intercept and slope values from step (e) in a pre-stack time migration equation with k shifted by an amount equal to the τ slope from step (e) multiplied by ω; and (g) reverse transforming said migrated image back to the space-time (x-t) domain.

DESCRIPTION OF THE DRAWINGS

The patent or application file contains at least one drawing executed in color. Copies of this patent or patent application publication with color drawings will be provided by the Office upon request and payment of the necessary fee.

The present inventive method and its advantages will be better understood by referring to the following detailed description and the attached drawings in which:

FIG. 8A illustrates a more complex velocity model than FIG. 2;

FIG. 8B illustrates a layered density model for the same spatial region covered by FIG. 8A;

Figure 1A:
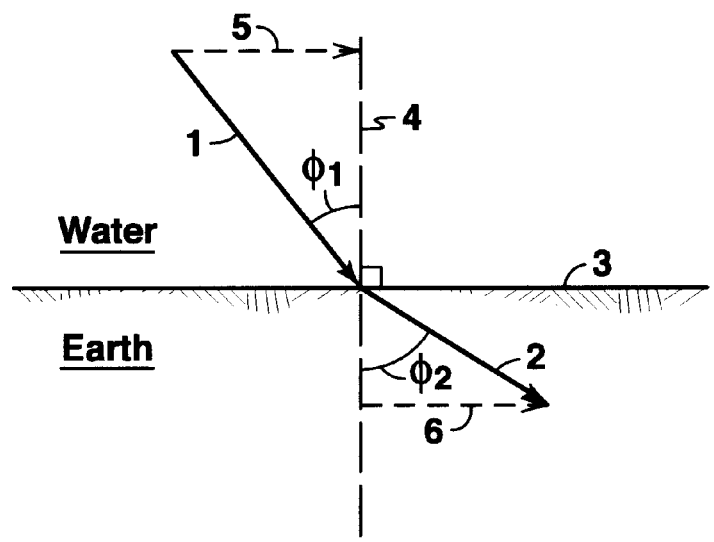
FIGS. 1A and 1B illustrate how Snell's law of optics can be applied to an inclined water bottom to show that a region with lateral velocity variation will change the horizontal component of the wave vector of an incident wave.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present inventive method for correcting mild lateral velocity variations in time migration uses several travel time maps obtained using velocity functions at locations across a survey to get the phase shift used in the migration and the phase shift slope along the lateral direction for a plane wave at every vertical time. Both the phase shift and the phase shift slope information at each vertical time are used in the migration operator to do the migration and correct the lateral velocity variation effect simultaneously in the frequency-wavenumber domain.

A convenient starting point for explaining the present invention is the paper "3-D prestack migration of common-offset data in the frequency-wavenumber domain" by Finn and Winbow, 72$^{nd}$ SEG International Meeting and Exposition, Extended Abstracts (2002). For simplicity, the derivation shown below is in two-dimensional space (lateral position x, vertical dimension represented by time t). The mathematics for extending to three dimensions will be obvious to persons of ordinary skill, and it is intended to include three-dimensional applications in this description and in the appended claims.

Finn's Eq. (4) can be rewritten (in two-dimensional form) as follows:

$$\psi(x) = \sum_{\omega} \int e^{-ikx+i\omega\tau(p)} \mu(k, \omega) dk \tag{1}$$

where $\mu(k,\omega)$ is the double Fourier transform of the common offset seismic data $\mu(x,t)$, $\omega\tau(p)$ is the phase shift for a plane wave with ray parameter $p=k/\omega$ at its stationary point, and $\psi(x)$ is the migrated image at horizontal position x (and vertical time $t_0$, which dependence is implicit in $\tau$). The variable $\omega$ represents the frequency of the wave multiplied by $2\pi$ and k is the horizontal (x) component of the wave vector. Finn's amplitude-preserving weight function can be and is ignored for purposes of the present invention. Finn's integral over $\omega$ has been replaced by a finite summation.

Next, the migrated image in the k-domain is obtained by Fourier transformation of Eq. (1):

$$\psi(x) = \sum_{\omega} \int \int e^{i(k-k')x} e^{i\omega\tau(p)} \mu(k', \omega) dk' dx \tag{2}$$

after switching k and k'.

Finn assumed that velocity varies only in the vertical direction which means that $\tau(p)$ depends on the ray parameter p and the vertical time $t_0$ (and not on x). In that event, the integral over x in Eq. (2) above reduces to the delta function $\delta(k-k')$, which further reduces Eq. (2) to $$\psi(k) = \sum_{\omega} e^{i\omega\tau(p)} \mu(k, \omega) \tag{3}$$

Eq. (3) can be referred to as traditional PSTM, as improved by Finn and Winbow to accommodate non-zero offsets.

The present invention modifies the approach in Finn to allow mild lateral velocity variations to be treated in approximate fashion. Thus, $\tau(p)$ becomes $\tau(p,x)$ and Eq. (2) above becomes $$\psi(x) = \sum_{\omega} \int \int e^{i(k-k')x+i\omega\tau(p,x)} \mu(k', \omega) dk' dx \tag{4}$$

which can be written $$\psi(x) = \sum_{\omega} \sum_{k'} G(k, k') \mu(k', \omega) \tag{5}$$

where $$G(k,k') = \int e^{i\omega\tau(p,x)} e^{i(k-k')x} dx \tag{6}$$

(The integral over k' was converted to a finite sum.)

For general lateral velocity variations, solving Eq. (5) (by computer algorithm) is quite expensive due to the double summation. In many real situations, however, the velocity has a global, linear increasing or decreasing behavior only in a specific lateral direction. In such cases, the phase shift $\omega\tau(p,x)$ at vertical time $t_0$ may be well approximated as a linear function of the lateral direction coordinate x, $$\tau(p,x) = \tau_0(p) + \tau_1(p)x \tag{7}$$

where $\omega\tau_0(p)$ is the phase shift as a function of ray parameter at a reference location, and $\omega\tau_1(p)$ is the phase shift slope along the lateral direction. The migration Eq. (5) can then be simplified, beginning with Eq. (6):

$$G(k, k') = e^{i\omega\tau_0(p)} \int e^{i[k-k'+\omega\tau_1(p)]x} dx = e^{i\omega\tau_0(p)} \delta(k-k'+\omega\tau_1(p))$$

using the definition of the delta function. This reduces Eq. (5) to $$\psi(k) = \sum_{\omega} e^{i\omega\tau_0(p')} \mu(k', \omega) \tag{8}$$

where $$k = k' - \omega\tau_1(p') \tag{9}$$

and $$p' = k'/\omega \tag{10}$$

By comparing Eq. (8) with Eq. (3), it can be seen that the present invention provides a migration operator that corrects for lateral velocity variation by shifting the wave number of the surface seismic wave to a different wave number in the image. The amount of shift, $\omega\tau_1(p')$, is the phase shift slope which depends on the lateral velocity variation.

Figure 1B:
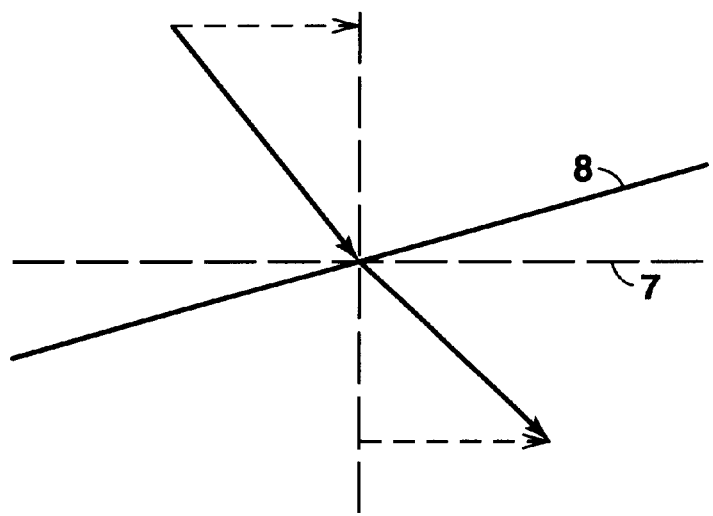

The derivation above is for any vertical time $t_0$. The correction to the lateral velocity variation varies with vertical time. In the case of no lateral velocity variation, the shift amount of the wave number is zero, and the wave number is conserved at all vertical times. The migration operation of Eq. (8) becomes Eq. (3). FIGS. 1A and 1B illustrate the effect of lateral velocity variation on the wave vector refracting through a horizontal flat water bottom (FIG. 1A) and a dipping water bottom (FIG. 1B). In FIG. 1A, the incident wave vector 1 makes an angle $\phi_1$ with respect to the normal 4 to the horizontal water bottom 3. After passing through the water bottom into the subsurface, the refracted wave vector 2 now makes a different angle $\phi_2$ with respect to the perpendicular direction because the wave velocity below the interface is different than that above the interface. Snell's Law relates the variables and can be written $$\frac{\sin\phi_1}{\sin\phi_2} = \frac{\lambda_1}{\lambda_2} = \frac{k_2}{k_1} \tag{11}$$

where $\lambda_1$ and $k_1$ are the wavelength and wave number (magnitude of the wave vector) in water and $\lambda_2$ and $k_2$ are the wavelength and wave number in the subsurface below the water bottom.

Thus, $$k_1 \sin\phi_1 = k_2 \sin\phi_2 \tag{12}$$

which means that the horizontal component 5 of the wave vector 1 above a horizontal water bottom 3 is equal to the horizontal component 6 of the wave vector 2 below the horizontal water bottom. Thus, in the terminology of Eq. (9), k=k', and there is no wave number shift.

Clearly this will not be true for FIG. 1B because Snell's Law applies relative to the normal to the interface 8 which is no longer the vertical. In FIG. 1A, there is no lateral (horizontal) velocity variation; in FIG. 1B, there is a lateral velocity variation that occurs where a horizontal line such as 7 intersects the dipping water bottom 8.

In reality, a dipping water bottom typically produces more of a lateral (horizontal) variation than merely a step-function change at the water bottom. The sediment velocity may often be approximated as a function of depth below the water bottom ($z-z_{wb}$) Since $z_{wb}$ is a function of horizontal position for a dipping water bottom, the velocity throughout the subsurface varies continuously with horizontal position at constant $z$. Just as in the simplified case illustrated in FIG. 1B, the changes in lateral velocity will cause changes in the horizontal component of the wave vector, with the general result that, for a dipping water bottom, the horizontal wave vector component k in the water is not equal to the horizontal wave vector component k' in the sediment. According to the present invention, this wave number shift can be approximated by equation (9) for mild lateral velocity variation.

In the traditional single velocity function PSTM, the difference between k' and k is ignored. In the present inventive method, the migration operation of Eq. (8) takes this k-shift of Eq. (9) into account by calculating the phase shift slope as in Eq. (7). By applying this technique, errors in both lateral position and vertical time can be reduced greatly. By comparing Eq. (8) to Eq. (3), one can see that the increase in computational costs compared to the one velocity case is very small. The extra computation is the mapping from the wave vector of the surface seismic data to that in the subsurface image as described by Eq. (9).

As Eq. (7) indicates, the present inventive method works for situations where the phase shift changes approximately linearly along a lateral direction. In practical applications, a dipping water bottom and/or a subsurface velocity with a gradually increasing or decreasing trend along a lateral direction may be well approximated by this linear assumption. One can select a few velocity functions across the survey to calculate the phase shift tables at those velocity locations. A linear fitting of the phase shift for a given ray parameter p and at a given vertical time $t_0$ versus the lateral location x can be performed to get the phase shift slope. The migration is performed according to Eq's. (8) and (9).

Figure 5:
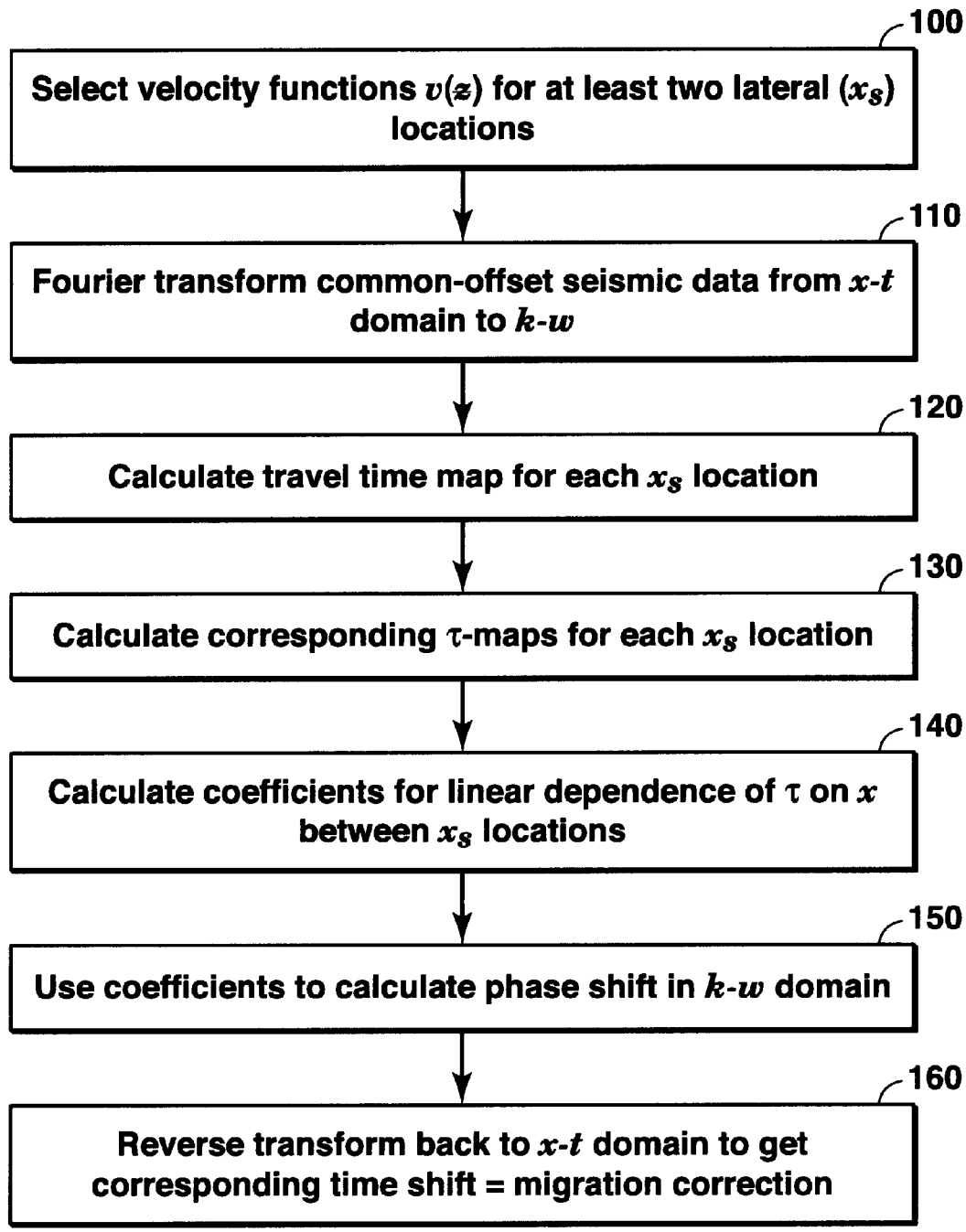
FIG. 5 is a flow chart illustrating the basic steps of the present inventive method for correcting pre-stack time migration to treat mild lateral variations in subsurface velocity.

A more detailed description of the present inventive method is given in the flow chart of FIG. 5.

At step 100, the user selects seismic velocity functions v($z$) at at least two lateral (x) locations. These velocity functions will be different functions of $z$. If they were the same function, there would be no change of velocity with lateral position (at constant $z$), and hence there would be no need to use the present invention. The number and spacing of lateral locations where a v($z$) is selected are governed by the need for any linear fit to accurately represent the linear component of the data being fit.

At step 110, common-offset surface seismic data (gathered from the region where the velocity functions in step 100 are evaluated) are transformed from the space-time (x,t) domain to the wave number—frequency (k,ω) domain. In preferred embodiments of the present inventive method, this transformation will be a double Fourier transform. The transformation is made because it is well known that a time shift in the x-t domain (i.e., migration of the seismic image from the perceived depth to the correct depth) is equivalent to a phase shift in the k-ω domain. It is further well known that migration of zero offset data by the application of phase shifts in the k-ω domain is much faster (in computation time) than the equivalent operation of time shifting in the x-t domain. Finn and Winbow extended this approach to include nonzero offset data; however, their method was limited to situations with no velocity variation in any lateral direction. The present inventive method relaxes that restriction.

At step 120, the user calculates a travel time map for each x-location, $x_s$, for which a velocity function v($z$) is selected in step 100. Each map determines t(x–$x_s$,$z$), the travel time from the source location $x_s$ to any subterranean point (x,$z$). The travel time is calculated by dividing the distance traveled (determined from the geometry) by the velocity (assumed to be a function only of $z$). The determination of travel time maps is a well known step in performing PSTM.

At step 130 of FIG. 5, τ-maps corresponding to the travel time maps from step 120 are calculated, one such map for each surface ($x_s$) location selected in step 100. This is the step discussed previously where a correspondence is made between time shifts in the x-t domain and phase shifts in the k-ω domain. The Finn-Winbow reference mentioned previously first disclosed a method for doing this. (Alternatively, see U.S. Pat. No. 6,446,007 to Finn and Winbow.) Their method is restricted to v=v($z$), with no x dependence, and the present inventive method satisfies that condition since a separate τ-map based on a one-dimensional velocity function is obtained for each surface location $x_s$. The Finn-Winbow method is described in detail in the Appendix hereto. The resulting maps yield τ as a function of the ray parameter p, where p=k/ω.

In each τ-map from step 130, τ(p) will not vary with x, but between τ-maps for adjacent $x_s$ locations, τ will vary with x. (This is why at least two $x_s$ locations are required for the present inventive method; a single $x_s$ location is the Finn-Winbow method.) At step 140, τ(p) is found as a linear function of x at each subsurface depth ($z$) by linear fitting across the τ-maps. Such linear fits yield the coefficients $\tau_0(p)$ and $\tau_1(p)$ in Eq. (7) for every vertical depth $z$ (or vertical time) and every p value.

As previously observed, the migration equation of the present inventive method, Eq. (8), is the same as the standard PSTM migration equation in the k-ω domain (Eq. 3) but with the k-shift of Eq. (9). With $\tau_0(p)$ and $\tau_1(p)$ now calculated, the difference k–k' can be calculated from Eq. (9) and Eq. (8) can then be used to calculate the migrated seismic image in k-ω space using well-known PSTM methods. This is step 150 of FIG. 5.

In the final step (160), the migrated image is reverse transformed (using the transform used in step 110) back to the x-t domain.

EXAMPLES

Three examples are given below to demonstrate the effectiveness of the present inventive method for correcting errors in both lateral position and vertical time in PSTM in the wave number and frequency domain. Each example applies a standard procedure in wide use for testing the accuracy of seismic processing algorithms.

Figure 2:
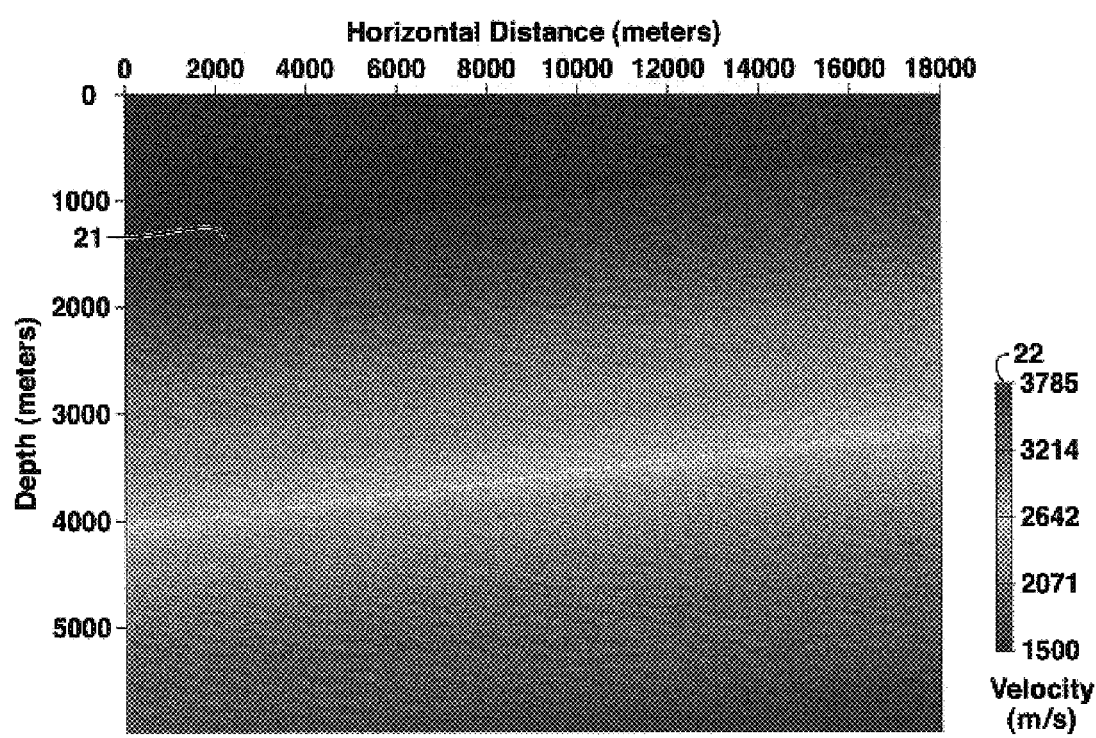
FIG. 2 illustrates a velocity model in which the velocity varies with both horizontal and vertical position.
Figure 3:
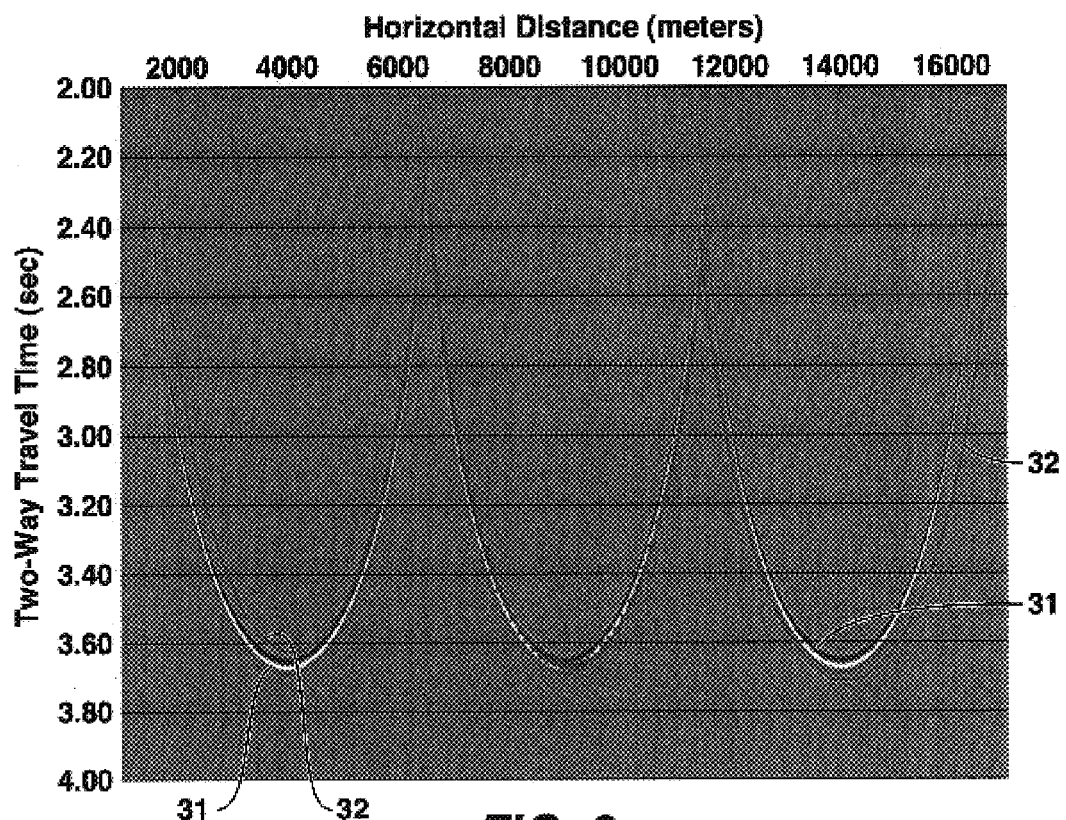
FIG. 3 illustrates an impulse response test at three horizontal locations using the velocity model of FIG. 2 and single-velocity pre-stack time migration.
Figure 4:
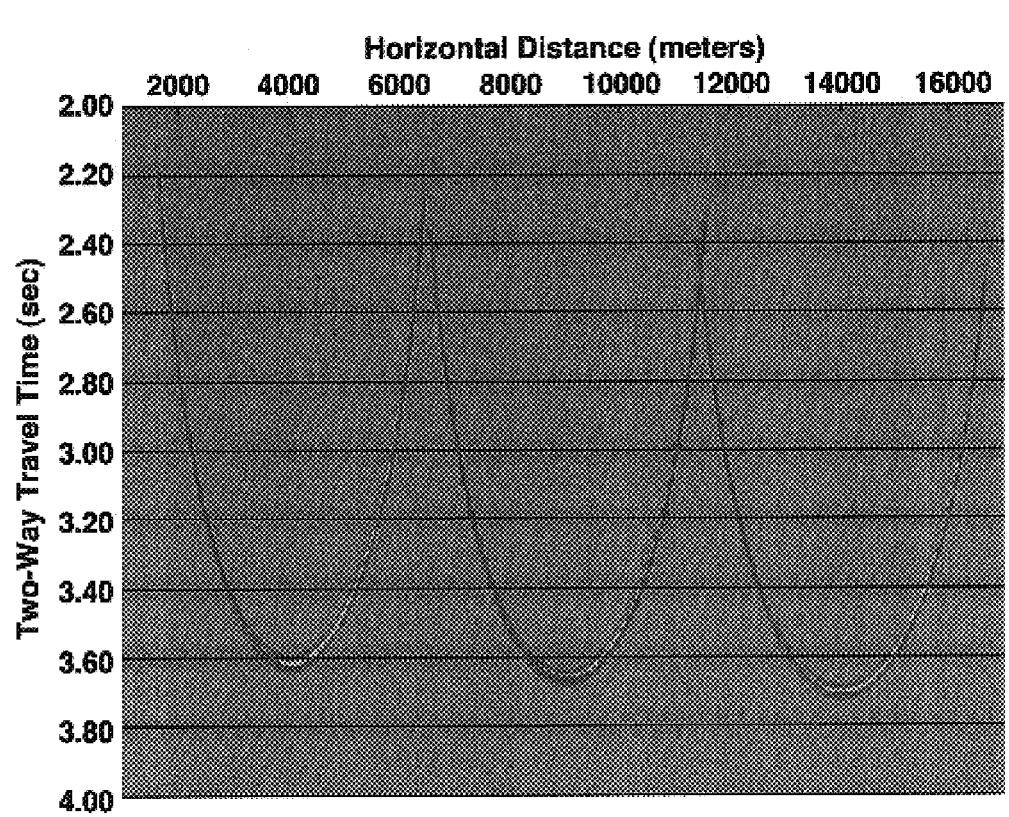
FIG. 4 illustrates the same impulse response test as FIG. 3 but with pre-stack time migration corrected by the present inventive method.

(1) Impulse Response Test:

The first example is an impulse response test for a velocity model with a dipping water bottom in two-dimensional space. FIG. 2 illustrates this velocity model. The water bottom 21 has a dip of about 3 degrees. The vertical axis is depth $z$ in meters and the horizontal axis is distance x in meters. The water depth ranges from 1500 m at the left end to 500 m at the right. The sediment velocity function is assumed to be given by the following linear function of depth $z$:

$$v(z) = 1600 + 0.4(z - z_{wb}) \quad (13)$$

where $z_{wb}$ is the water depth in meters. Because the water bottom is slightly dipping (approximately 3 degrees), $z_{wb}$ depends on horizontal position x, and therefore v is actually a function of both $z$ and x. Because the dip is slight, the horizontal velocity dependence is mild, and therefore the situation depicted is both common and well suited for application of the present inventive method. In the sediment below the water bottom in FIG. 2, the shading depicts (see scale 22, in m/s) how the seismic wave velocity in the sediment varies continuously with both $z$ and x, in accordance with Eq. (13). The seismic wave velocity in the water above interface 21 is assumed to be 1500 m/s, and is constant throughout the water volume. Impulse responses at three horizontal locations, 4,000 m, 9,000 m, and 14,000 m, of two-way travel time T=4 seconds and offset 3,000 m are computed and shown in FIG. 3 and FIG. 4. This means that there are three different source-receiver locations, with source and receiver always 3,000 meters apart, and the mid-point between them located at 4,000 m, 9,000 m and 14,000 m. The purpose of this particular impulse response test is to calculate (and display graphically in FIGS. 3 and 4) where subsurface reflectors would have to be located to reflect seismic waves originating at the stated source positions back to receivers at the stated offset (lateral distance from the source) subject to the constraint that the total travel time is always 4 seconds. In FIGS. 3 and 4, horizontal distance in meters is plotted on the horizontal axis, and vertical two-way travel time in seconds is plotted on the vertical axis. Both FIGS. 3 and 4 use and depend upon the velocity distribution of FIG. 2. Focusing on the left-most of the three concave-up reflectors depicted in either FIG. 3 or FIG. 4, the lowest point lies at about 3.6 seconds on the vertical axis. Since vertical two-way travel time is plotted on that axis, a value of 3.6 seconds at x=4,000 meters means that the low point of the reflector is located at a depth such that an acoustic seismic wave requires 1.8 seconds to travel vertically downward from the water surface with velocity as given by the variable distribution of FIG. 2. That the "depth" is 1.8 seconds rather than 2.0 seconds is explained by the fact that the source is at x=2,500 meters and the receiver at x=5,500 meters and thus the detected wave reflected at the low point of the reflector travels slightly further than the vertical path for a wave where source and receiver are both located at x=4,000 meters. In this manner, if any point on the reflector curve is connected in a ray path to the source at x=2,500 meters and to the detector at x=5,500 meters, the total travel time is 4.0 seconds, which is the constraint given for the calculational exercise.

The other two concave-up curves in FIGS. 3 and 4 represent where reflections would have to occur to generate two-way travel times of 4 seconds for the other two source-detector locations assumed for the problem:

x=7,500 m (source) and 10,500 m (detector); and x=12,500 m (source) and 15,500 m (detector)

Examining more closely the concave-up shapes in FIG. 3, the black and white variable density plot 31 is generated by PSTM using a single velocity function (Eq. 13) evaluated at the middle location, x=9,000 m, i.e., using Eq. (13) with $z_{wb} \cong 1,000$ m. The black and white variable density plot is used to reflect the finite seismic impulse duration in the model data set. Red curve 32 represents the exact result. In FIG. 4, the present inventive method has been used to generate the variable density plot. The velocity function of Eq. (13) was evaluated at three horizontal locations (4,000 m, 9,000 m, and 14,000 m) to calculate the phase shift and phase shift slope in Eq. 7. The exact result curve is now so completely superimposed upon the variable density plot that it is almost impossible to distinguish. Note that the exact result (the same as curve 32 in FIG. 3) shows that the reflector bottom falls slightly deeper as the horizontal location is moved to a larger x-value, a consequence of sediment velocities that increase with x for a given depth (see FIG. 2). PSTM is unable to show this effect; the three concave-up variable density plots 31 in FIG. 3 are identical in shape and location. There are errors in both vertical time and lateral position at locations away from x=9,000 m where the velocity function was evaluated. As FIG. 4 shows, the present inventive method has compensated these errors caused by lateral velocity variations within the migration operation.

For this example, evaluating the velocity function at three locations gives excellent results, and there is no need to use more than three locations. In general, the number of locations needed to get an acceptable linear fit, given the degree of linearity that the data actually exhibit, is problem-dependent.

The "exact" result as shown by curve 32 in FIGS. 3 and 4 is calculated by well-known ray tracing methods using the full $(x,z)$ dependence of the velocity function of Eq. (13). A travel time map is created wherein at each point $(x,z)$ the travel time to (a) the source and (b) the receiver is calculated using the velocity function of Eq. (13). Then, all points where the two travel times sum to 4 seconds are located and connected with a curve, which is curve 32 in FIGS. 3 and 4.

Figure 6:
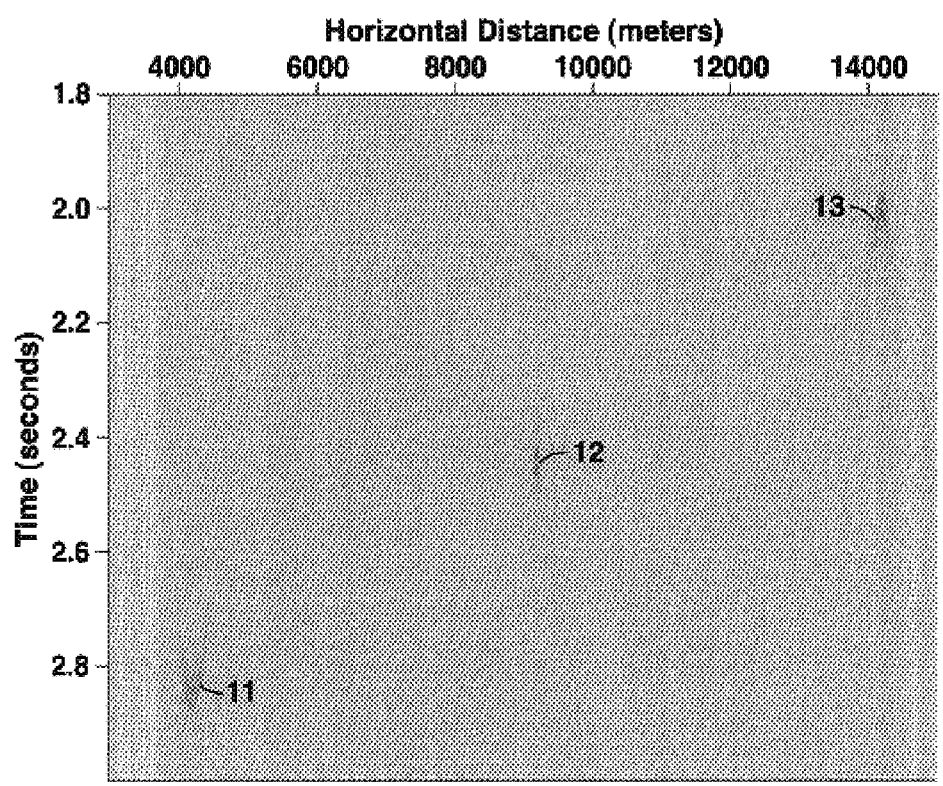
FIG. 6 illustrates the image of a common offset section for a point-diffractor model consisting of three point-diffractors at different horizontal locations, using pre-stack time migration and a single velocity function evaluated at the middle diffractor location.
Figure 7:
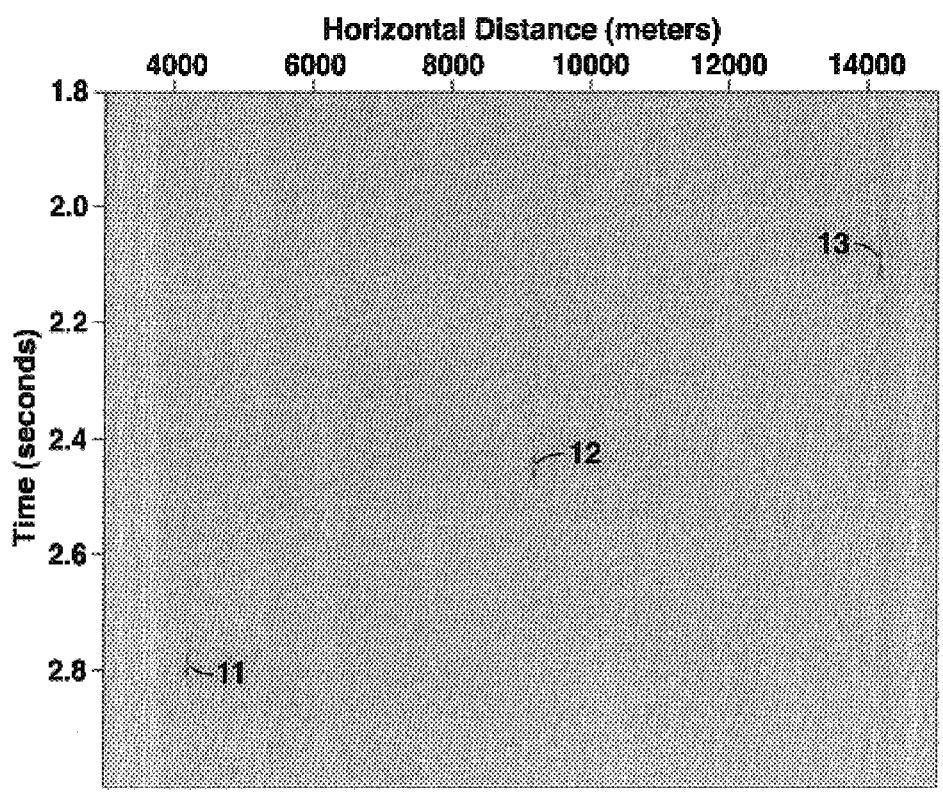
FIG. 7 illustrates the same test of focusing three point-diffractors as shown in FIG. 6, except the present inventive method is used to correct pre-stack time migration.

2. Focusing of Point Diffraction:

The velocity model used in this example is the same as that used in the impulse response example, and is shown in FIG. 2. There are three point diffractors located at horizontal locations of 4,000 m, 9,000 m, and 14,000 m, respectively. A common offset seismic section of offset 3 Km was collected. This common offset section was migrated by using both the regular PSTM and the present inventive method. The images 11, 12 and 13 of the three point-diffractors are shown in FIG. 6 (regular PSTM) and FIG. 7 (present invention). The velocity function used in the regular PSTM was taken from horizontal location 9,000 m. For the present inventive method, three velocity functions at horizontal locations 4,000 m, 9,000 m, and 14,000 m were used in the calculation of phase shift slope in Eq. 7. A good migration algorithm should be able to collapse the diffraction energy into well-focused points. The diffractors at horizontal locations 4,000 m and 14,000 m in FIG. 6 from regular PSTM are much less focused compared to the image at 9,000 m because of the failure to account for the lateral velocity variation in the imaging process. All three diffractors are focused very well in FIG. 7 where the k-shift is applied in the PSTM as taught in the present inventive method.

Figure 9A:
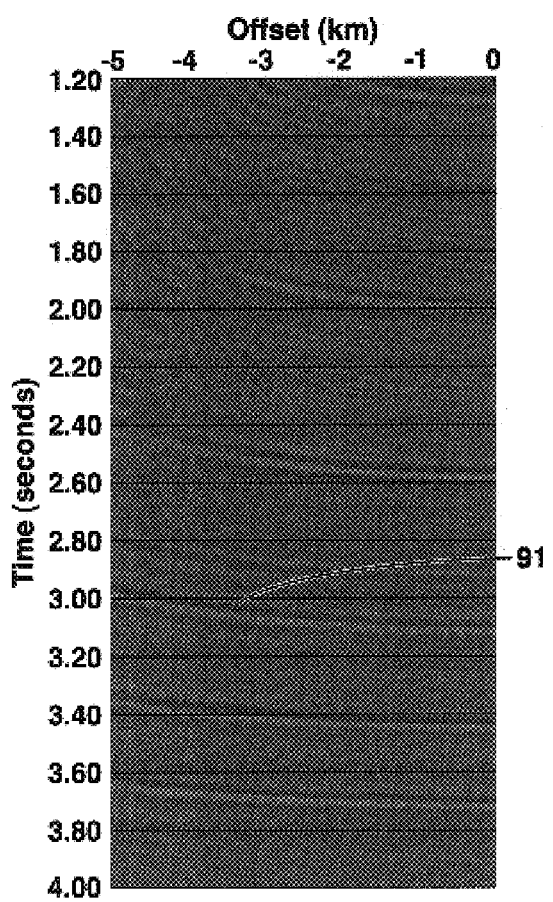
FIG. 9A illustrates how well pre-stack time migration images subsurface reflectors using reflections from the same middle point but with different offsets.
Figure 9B:
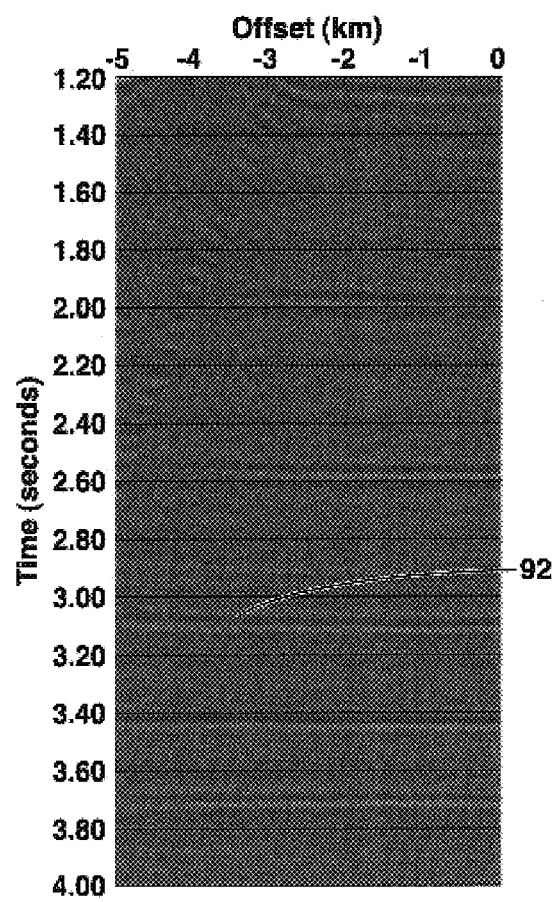
FIG. 9B illustrates the same imaging exercise as in FIG. 9A but with the present inventive method used to correct the pre-stack time migration.

(3) A General Two-Dimensional Synthetic Model:

The velocity and density models used for this example are shown in FIGS. 8A and 8B, respectively. This model has a dipping water bottom which can be seen at 81 in both drawings beginning at a depth of approximately 90 meters on the left and dipping to approximately 390 meters on the right, which is a dip of approximately one degree. As indicated by the shading (see scale 82, in m/s), the sediment velocity field is smooth. The velocity has both a constant vertical and a constant lateral gradient. The velocity contour has an effective dip about 3.6 degrees. A thin salt body 83 was inserted into the sediment. The density is a layered model. The density within a layer is constant. (See density scale 84, in gm/cm³.) The seismic reflections come from the density contrast interfaces and the salt boundary. A 2-D acoustic wave equation modeling code was used to generate the seismic data. Both the single velocity function PSTM (Eq. (3)) and the present inventive method (Eq.'s (7), (8) and (9)) have been applied to this data set. The velocity function used in the regular single velocity function PSTM was taken from near the center of the model. The migrated common middle point gathers from both methods at horizontal location 6,250 meters are shown in FIGS. 9A and 9B. The migrated gather from the present inventive method shown in FIG. 9B is much flatter than that using the traditional single velocity function PSTM shown in FIG. 9A. An example is the reflector 92, accurately imaged in FIG. 9B at a vertical two-way time of approximately 3.1 seconds. The same reflector is imaged by the curve 91 in FIG. 9A. This comparison indicates that the migration operator used in the present inventive method has corrected the lateral velocity variation effect, and has migrated the reflections of different offsets to the same vertical time.

Figure 10:
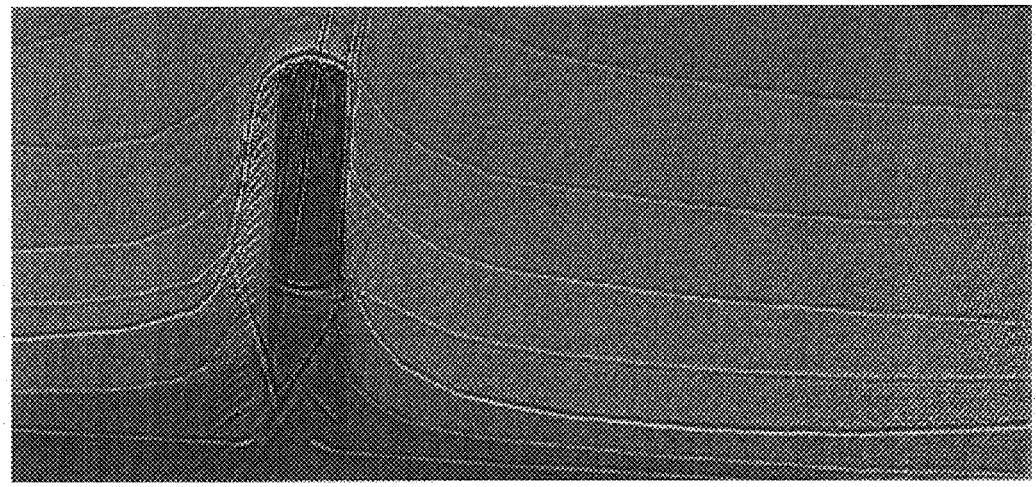
FIG. 10 illustrates the stacked image obtained from single velocity pre-stack time migration of the synthetic model data set represented by FIGS. 8A and 8B.
Figure 11:
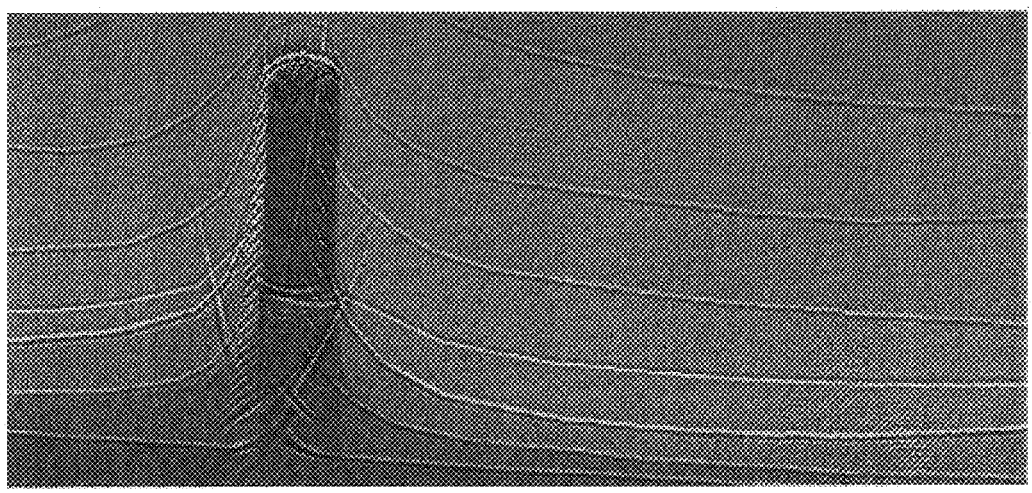
FIG. 11 illustrates the stacked image of the same synthetic model as in FIG. 10 but with the present inventive method used to correct pre-stack time migration.

The stacked images of this model from both methods are shown in FIGS. 10 and 11, with FIG. 10 showing the traditional PSTM (as improved by Finn and Winbow) method and FIG. 11 the present inventive method. FIGS. 10 and 11 reflect the layered density model used in the synthetic data generation, as shown in FIG. 8B. The mis-positioned reflectors can be seen clearly in FIG. 10, especially at the left side of the salt body, where the reflectors are steep. The phase slope in the present inventive method was obtained by using three velocity functions. The imaged reflector positions at the left side of the model from the present inventive method in FIG. 11 are much more accurate (closer to the density model of FIG. 8B) than that of the regular single velocity PSTM in FIG. 10. This image improvement is the result of including the lateral velocity variations in the migration. Small stairs can be detected on the density contrast interfaces in the density model. These small stairs give rise to diffraction energy in the data set. To focus the diffraction energy correctly, both accurate lateral and vertical positioning are needed. Improved imaging of these small stairs in FIG. 11 compared to FIG. 10 can be seen by inspecting the reflectors at the right side of the model.

Appendix

According to Finn and Winbow, controlled-amplitude prestack time migration in the $\omega$-$\vec{k}$ domain is implemented using the following migration equation:

$$D_M(\vec{x}) = \int d^2\vec{k} e^{-i\vec{k}\cdot\vec{x}} \int d\omega e^{i\omega T(\vec{\eta},z)} \tilde{D}(\omega,\vec{k}) \frac{w(\vec{\eta},z)}{K_{3D}^{1/2}(\vec{\eta},z)} \quad (A\text{-}2)$$

where $D_M(\vec{x})$ is the migrated image at point $\vec{x}$, $\tilde{D}(\omega,\vec{k})$ represents the input data after Fourier transformation with respect to time and midpoint so as to transform the data to the $\omega$-$\vec{k}$ domain, $T(\vec{\eta},\vec{z})$ is the migration time shift function (called $\tau$ in the description of the present invention), and $w(\vec{\eta},\vec{z})/K_{3D}^{1/2}(\vec{\eta},\vec{z})$ is an amplitude-preserving weight function.

Figure 12:
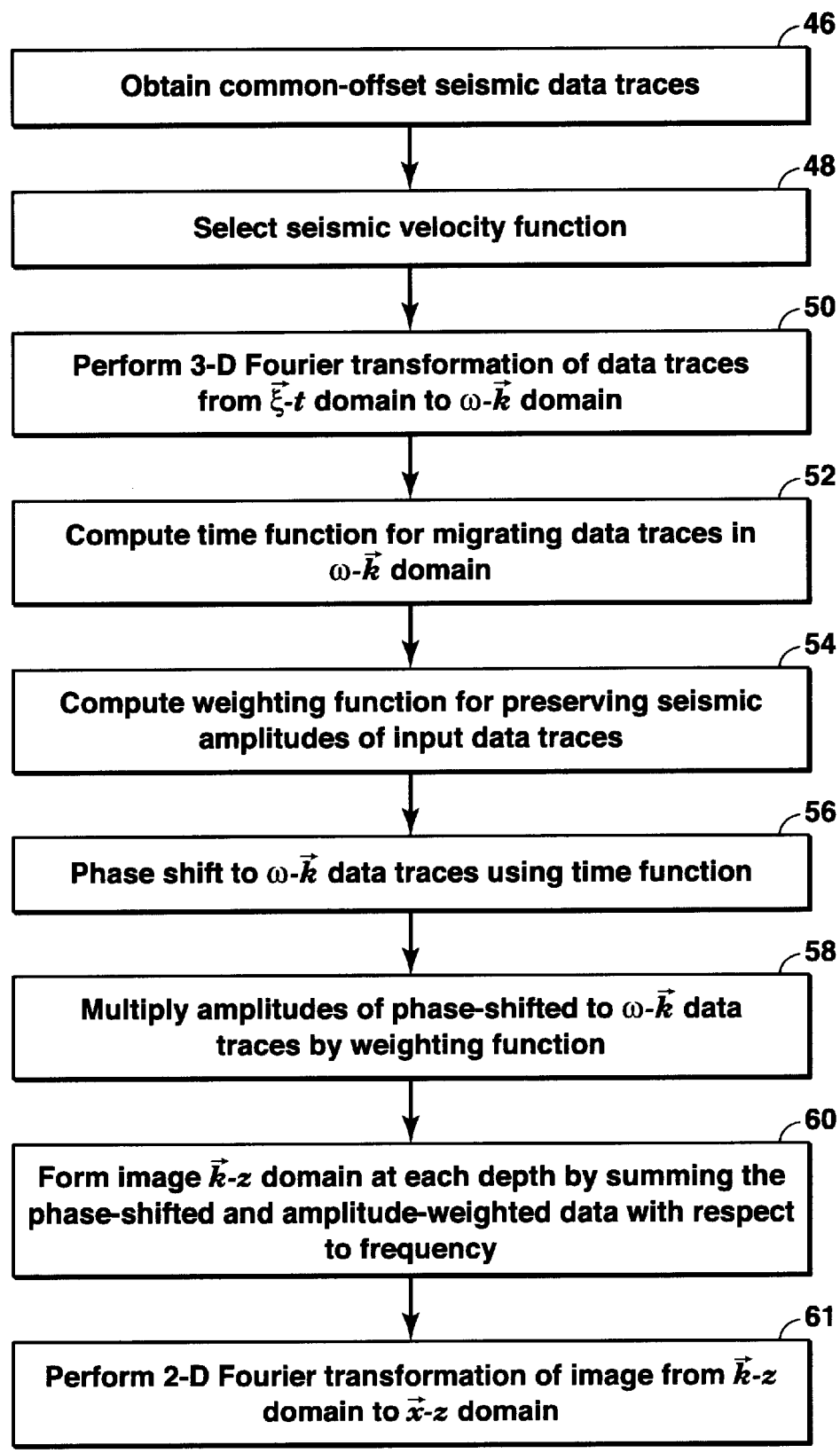
FIG. 12 is a flow chart illustrating a process for performing controlled amplitude pre-stack time migration in three-dimensional space (the "Finn-Winbow" method).

FIG. 12 is a flowchart illustrating the principal steps used in performing controlled amplitude prestack time migration in the $\omega$-$\vec{k}$ domain according to Eq. (A-2). At step 46, a set of common-offset seismic data traces is obtained. Initially, these data traces are in the space-time ($\vec{\xi}$-t) domain. Next, at step 48, a seismic velocity function for the subsurface region in question is selected. As noted above, a basic assumption of the Finn-Winbow method is that the subsurface seismic velocity is a function of depth or time, but is laterally invariant. Techniques for selecting an appropriate seismic velocity function for use in the present invention are well known to persons skilled in the art and, accordingly, will not be described further herein.

At step 50, the common-offset data traces obtained at step 46 are 3-D Fourier transformed from the $\vec{\xi}$-t domain to the $\omega$-$\vec{k}$ domain. In Eq. (A-2), the Fourier transformed data traces are denoted by $\tilde{D}(\omega,\vec{k})$.

At step 52, the seismic velocity function selected at step 48 is used to compute a time function for use in migrating the transformed data traces in the $\omega$-$\vec{k}$ domain. This time function is denoted by $T(\vec{\eta},\vec{z})$ in Eq. (A-2) and is defined by:

$$T(\vec{\eta},z) = t_D - \vec{p}\cdot\vec{\eta} \quad (A\text{-}3)$$

where $$\vec{p} = \left(\frac{\partial t_D}{\partial \vec{\eta}}\right)_z \quad (A\text{-}4)$$

is the midpoint ray parameter computed at fixed depth. As is well known to those skilled in the art, the ray parameter $\vec{p}$ is the horizontal component of the slowness vector. As further described below, the time function $T(\vec{\eta},\vec{z})$ is converted to the $\vec{p}$-$\vec{z}$ (dip-depth) domain before it is applied to the transformed data traces.

At step 54, a weighting function for preserving the seismic amplitudes of the input data traces is computed. As noted above, the weighting function is denoted by $w(\vec{\eta},\vec{z})/K_{3D}^{1/2}(\vec{\eta},\vec{z})$ in Eq. (A-2).

$w(\vec{\eta},\vec{z})$ is the weight function described by Schleicher et al., in "3-D true amplitude finite-offset migration", 58 *Geophysics*, pp. 1112–1126 (1993). According to Schleicher et al., the weight function depends on $\vec{\xi}$ and $\vec{x}$, and is given by:

$$w(\vec{\xi},\vec{x}) = \frac{\sqrt{\cos\alpha_s \cos\alpha_G}}{v_s} \frac{|\det(N_{SR} + N_{RG})|}{\sqrt{|\det N_{SR}|}\sqrt{|\det N_{RG}|}} \quad (A\text{-}5)$$

where $\alpha_s$ is the surface dip angle of the ray connecting the source $\vec{s}$ and the reflection point $\vec{x}$, $\alpha_G$ is the surface dip angle of the ray connecting the receiver $\vec{g}$ and the reflection point $\vec{x}$, $v_s$ is the surface compressional wave velocity, and the matrices are given by:

$$N_{SR} = \begin{pmatrix} \frac{\partial^2 t_1}{\partial \xi_x \partial \rho} & \frac{\partial^2 t_1}{\partial \xi_y \partial \rho} \\ \frac{\partial^2 t_1}{\partial \xi_x \partial \sigma} & \frac{\partial^2 t_1}{\partial \xi_y \partial \sigma} \end{pmatrix} \quad (A\text{-}6a)$$

and, $$N_{RG} = \begin{pmatrix} \frac{\partial^2 t_2}{\partial \xi_x \partial \rho} & \frac{\partial^2 t_2}{\partial \xi_y \partial \rho} \\ \frac{\partial^2 t_2}{\partial \xi_x \partial \sigma} & \frac{\partial^2 t_2}{\partial \xi_y \partial \sigma} \end{pmatrix} \quad \text{(A-6b)}$$

where $\rho$ and $\sigma$ are coordinates on a plane tangential to the reflector at the reflection point R. Given a knowledge (for example, from a time map) of the rays connecting the source and receiver to the reflection point, all of the above derivatives can be calculated. The source and receiver locations are $\vec{s} = \vec{\xi} + \vec{h}$ and $\vec{g} = \vec{\xi} - \vec{h}$, where $\vec{h}$ is the half-offset as a two-dimensional vector on the earth's surface. Since $\vec{\eta} = \vec{x} - \vec{\xi}$, the weight function $w(\vec{\xi}, \vec{x})$ may be expressed as a function of $\vec{\xi}$ and $\vec{x}$ or as a function of $\vec{\eta}$ and $z$. Alternatively, the weight function $w(\vec{\eta}, z)$ can be computed using dynamic ray tracing, as described in Hanitzsch, "Comparison of weights in prestack amplitude preserving Kirchhoff depth migration," 62 *Geophysics*, pp. 1812–1816 (1997).

The factor $K_{3D}(\vec{\eta}, z)$ is a normalization factor used to adjust for differences between working in $\vec{x}$ space and working in $\vec{k}$ space. $K_{3D}(\vec{\eta}, z)$ is defined by the following equation:

$$K_{3D}(\vec{\eta}, z) = \det\left[\frac{\partial^2 t_D}{\partial \eta_i \partial \eta_j}\right] \quad \text{(A-7)}$$

where the indices i and j take on the values x and y corresponding to the two components of the variable $\vec{\eta}$.

As with the time function $T(\vec{\eta}, z)$, the amplitude-preserving weighting function $w(\vec{\eta}, z)/K_{3D}^{1/2}(\vec{\eta}, z)$ is converted to the $\vec{p}$-$z$ (dip-depth) domain before it is applied to the transformed data traces. This conversion is described in detail below.

At step 56, the transformed data traces $\tilde{D}(\omega, \vec{k})$ are phase shifted using the time function calculated at step 52.

Next, at step 58, the phase-shifted data traces are multiplied by the amplitude-preserving weighting function calculated at step 54.

Finally, at steps 60 and 61, the phase-shifted and weighted data traces are transformed from the $\omega$-$\vec{k}$ domain back to the $\vec{x}$-$z$ domain. This is accomplished in two stages. First, at step 60, an image is formed in the wavenumber ($\vec{k}$) domain by summing with respect to frequency $\omega$. Then, at step 61, the $\vec{k}$ domain image is 2-D Fourier transformed back to the $\vec{x}$ domain. The result of this process is $\vec{x}$-$z$ domain migrated data traces in which the migration process has preserved seismic amplitudes.

The functions T and $w/K_{3D}^{1/2}$ are together referred to as the "migration operator," $\vec{M} = (T, w/K_{3D}^{1/2})$. A fundamental difficulty in the implementation of Eq. (A-2) arises because the functions T and $w/K_{3D}^{1/2}$ are initially calculated in $\eta$-$z$ space while the transformed data traces are in $\omega$-$\vec{k}$ space. To overcome this difficulty, T and $w/K_{3D}^{1/2}$ are first converted to the $\vec{p}$-$z$ domain, as further described below. The conversion of T and $w/K_{3D}^{1/2}$ to $\vec{p}$-$z$ space permits an efficient implementation of Eq. (A-2) since points in $\vec{p}$-$z$ space can be related to points in $\omega$-$\vec{k}$ space using the following relationship:

$$\vec{p} = \frac{\vec{k}}{\omega} \quad \text{(A-8)}$$

What is claimed is:

1. A method for pre-stack migration of common offset seismic traces obtained from a subterranean region where the seismic velocity varies both laterally (with x) and vertically (with $z$), said method comprising the steps of:
   a) selecting seismic velocity functions $v(z)$ at least two lateral ($x_s$) locations (at least three locations for 3D application) in said subterranean region, the number of such locations being determined by the degree of lateral velocity variation;
   b) transforming said common offset seismic data traces from the space-time (x-t) domain to the wave number—frequency (k-$\omega$) domain;
   c) calculating a travel time map for each $x_s$ location using the velocity function selected for such location;
   d) calculating for each travel time map from step (c) a corresponding map of $\tau$ as a function of wave number p, where $\omega\tau$ is the phase shift in the k-$\omega$ domain corresponding to the migration time shift in the x-t domain;
   e) using the $\tau$-maps to find $\tau$ (p) as a linear function of x with a certain slope at each depth ($z$) in the subterranean region;
   f) forming the migrated image from said seismic traces in the $\omega$-k domain using pre-stack time migration with k shifted by an amount equal to the $\tau$ slope from step (e) multiplied by $\omega$; and
   g) reverse transforming said migrated image back to the space-time (x-t) domain.

2. The method of claim 1, wherein said transformation is a double Fourier transform.

3. The method of claim 1, wherein the Finn-Winbow method provides the corresponding map of $\tau$.

4. A method for producing hydrocarbons from a subterranean region where the seismic velocity varies both laterally (with x) and vertically (with $z$), using common offset seismic data obtained from said region, said method comprising the steps:
   a) selecting seismic velocity functions $v(z)$ at least two lateral ($x_s$) locations in said subterranean region, the number of such locations being determined by the degree of lateral velocity variation;
   b) transforming said common offset seismic data traces from the space-time (x-t) domain to the wave number—frequency (k-$\omega$) domain;
   c) calculating a travel time map for each $x_s$ location using the velocity function selected for such location;
   d) calculating for each travel time map from step (c) a corresponding map of $\tau$ as a function of wave number p, where $\omega\tau$ is the phase shift in the k-$\omega$ domain corresponding to the migration time shift in the x-t domain;
   e) using the $\tau$-maps to find $\tau$ (p) as a linear function of x with a certain slope at each depth (z) in the subterranean region;

f) forming the migrated image from said seismic traces in the ω-k domain using pre-stack time migration with k shifted by an amount equal to the τ slope from step (e) multiplied by ω;

g) reverse transforming said migrated image back to the space-time (x-t) domain;

h) using the migrated images from step (g) to assess the commercial hydrocarbon potential of the subterranean region; and i) producing any hydrocarbons identified in step (h).

* * * * *